United States Patent
Lanzo et al.

(10) Patent No.: US 7,873,361 B2
(45) Date of Patent: *Jan. 18, 2011

(54) METHOD AND SYSTEM FOR RADIO COVERAGE PLANNING WITH MULTIPLE RESOLUTION PROFILE APPROACH

(75) Inventors: Roberto Lanzo, Turin (IT); Alessandro Leoni, Turin (IT); Loris Stola, Turin (IT)

(73) Assignee: Telecom Italia S.p.A., Milan (IT)

( * ) Notice: Subject to any disclaimer, the term of this patent is extended or adjusted under 35 U.S.C. 154(b) by 536 days.

This patent is subject to a terminal disclaimer.

(21) Appl. No.: 10/588,371

(22) PCT Filed: Feb. 5, 2004

(86) PCT No.: PCT/EP2004/050088

§ 371 (c)(1),
(2), (4) Date: May 15, 2007

(87) PCT Pub. No.: WO2005/076646

PCT Pub. Date: Aug. 18, 2005

(65) Prior Publication Data

US 2007/0270153 A1 Nov. 22, 2007

(51) Int. Cl.
*H04W 40/00* (2009.01)

(52) U.S. Cl. .......... 455/446; 455/67.11; 455/550.1; 455/447; 455/419; 455/424

(58) Field of Classification Search .......... 455/422.1, 455/423, 67.11, 414.1, 443, 446, 456.1, 403, 455/550.1, 466, 447, 69.11, 550, 419, 424
See application file for complete search history.

(56) References Cited

U.S. PATENT DOCUMENTS 5,561,841 A * 10/1996 Markus .......... 455/446

(Continued)

FOREIGN PATENT DOCUMENTS

EP 0 865 221 A1 9/1998

(Continued)

OTHER PUBLICATIONS

G. Bussolino et al; "Rasputin: a field strength prediction model for large and small cell mobile system using territorial data-base", 7th International Network Planning Symposium, Sidney, pp. 191-196, (1996).

(Continued)

*Primary Examiner*—Kamran Afshar
*Assistant Examiner*—Babar Sarwar
(74) *Attorney, Agent, or Firm*—Finnegan, Henderson, Farabow, Garrett & Dunner, L.L.P.

(57) ABSTRACT

A method for planning a radiocommunications network includes computing cell coverage in turn including dividing a region around a radio base station into a number of large environment pixels, dividing each large environment pixel into a number of small environment pixels, and, for each target small environment pixel, computing a second quantity indicative of the coverage within the target small environment pixel, wherein each second quantity is computed for the respective target small environment pixel as a function of a mixed environment profile describing the environment between the radio base station and the target small environment pixel along a propagation path of a radioelectric signal radiating out from the radio base station and passing through the target small environment pixel, wherein the mixed environment profile describes the environment within small environment pixels close to the radio base station and the target small environment pixel, and within large environment pixels along the remaining stretch of the radioelectric signal propagation path.

17 Claims, 5 Drawing Sheets

U.S. PATENT DOCUMENTS

| | | | |
|---|---|---|---|
| 5,953,669 A * | 9/1999 | Stratis et al. | 455/449 |
| 6,002,935 A * | 12/1999 | Wang | 455/447 |
| 6,047,238 A * | 4/2000 | Olofsson | 702/2 |
| 6,111,857 A * | 8/2000 | Soliman et al. | 370/254 |
| 6,173,168 B1 * | 1/2001 | Andersson | 455/404.1 |
| 6,173,185 B1 * | 1/2001 | Bernardin et al. | 455/446 |
| 6,587,690 B1 * | 7/2003 | Di Huo et al. | 455/446 |
| 6,636,739 B1 * | 10/2003 | Fagen et al. | 455/453 |
| 6,792,248 B1 * | 9/2004 | Naghian | 455/69 |
| 7,363,039 B2 * | 4/2008 | Laroia et al. | 455/448 |
| 7,469,144 B2 * | 12/2008 | Vicharelli et al. | 455/446 |
| 2001/0041565 A1 | 11/2001 | Vicharelli et al. | |
| 2005/0090217 A1 * | 4/2005 | Zhu | 455/242.1 |
| 2007/0037579 A1 * | 2/2007 | Francalanci et al. | 455/446 |
| 2007/0270153 A1 * | 11/2007 | Lanzo et al. | 455/446 |
| 2007/0281706 A1 | 12/2007 | Stola et al. | |

FOREIGN PATENT DOCUMENTS

| EP | 1 292 163 A1 | 3/2003 |
|---|---|---|

OTHER PUBLICATIONS

M. Perucca et al.;"Small cells planning analysis of electromagnetic models from measurements at 1800 MHz", ICAP, pp. 1-12, (1997).

M. Hata; "Empirical formula for propagation loss in land mobile services", IEEE Trans. On Vehicular Technology, vol. 29, No. 3, pp. 317-325, (1980).

"Propagation data and prediction methods for the planning of short range outdoor radio communication systems and radio local area networks in a frequency range 300 MHz to 100 GHz", Rec. ITU—R P.1411, pp. 1-11, (1999).

"Radiowave propagation effects on next generation fixed service terrestrial telecommunication systems", COST 235, Chap. 4, Final Report EUR 16992 EN, pp. 242-251 and 404-407,(1996).

"Digital mobile radio towards future generation systems", COST Action 231-Walfisch-Ikegami-Model, Chap 4, Final Report EUR 18957, pp. 135-140, (1999).

"Propagation by diffraction", ITU Radiocommunication Assembly, Document 3/1007-E, Draft Revision of Recommendations ITU-R PN.526-3, pp. 1-24, (1995).

E. Damosso et al.; "Propagazione Nei Sistemi Radiomobili Terrestri", Radiopropagazione, Scuola Superiore Guglielmo Reiss Romoli, L'Aquila, pp. 129-141 and 166-187, (1992).

Cichon, et al., "Ray Optical Prediction of Outdoor and Indoor Coverage in Urban Macro- and Micro-Cells," Vehicular Technology Conference, IEEE $46_{th}$ Atlanta, GA, pp. 41-45, Apr. 28, 1996.

Dersch, et al., "Modelling and Simulation of Indoor Radio Channels," Proceedings of the International Conference on Communications (ICC), IEEE, vol. 3, pp. 1970-1974, May 23, 1993.

Office Action mailed from the U.S. Patent and Trademark Office on May 26, 2009, in U.S. Appl. No. 10/588,370, filed May 16, 2007, 14 pages.

Office Action mailed from the U.S. Patent and Trademark Office on Dec. 24, 2009, in U.S. Appl. No. 10/588,370, filed May 16, 2007, 16 pages.

Notice of Allowance and Fee(s) Due mailed to Jul. 19, 2010 from the U.S. Patent and Trademark Office, in U.S. Appl. No. 10/588,370, filed May 16, 2007, 11 pages.

* cited by examiner

METHOD AND SYSTEM FOR RADIO COVERAGE PLANNING WITH MULTIPLE RESOLUTION PROFILE APPROACH

CROSS REFERENCE TO RELATED APPLICATION

This application is a national phase application based on PCT/EP2004/050088, filed Feb. 5, 2004, the content of which is incorporated herein by reference.

TECHNICAL FIELD OF THE INVENTION

The present invention relates in general to radiocommunications network planning. In particular, the present invention finds an advantageous, but not exclusive, application in the planning of a radiocommunications network for mobile terminals, comprising a number of (large or small) cells distributed over a particular geographical area or territory, to which the ensuing treatment will explicitly refer, without this entailing any loss of generality.

BACKGROUND ART

As is known, the first essential step of a process for designing and planning a radiocommunications network for mobile terminals is computing the so-called cell coverage, i.e., extent and features of a region around a radio base station where radioelectric signals received by a mobile terminal and radiating out from the radio base station cope with given requirements.

Generally, this region is the locus of points where the strength, or a quantity related thereto, of a radioelectric signal received by the mobile terminal and radiating out from the radio base station exceeds a given threshold. Such a threshold may be defined by using different criteria, the most adopted of which are detectability of a reference channel in the radioelectric signal received by the mobile terminal, and transmission error rate higher than a threshold value.

Traditionally, one of the most frequently used methods for computing cell coverage includes radially scanning the region around the radio base station along angularly equispaced radial scanning line connecting the radio base station and the point where one of the following three quantities, which, considered singularly, may be regarded as indicative of the cell coverage, is to be computed: the point strength of the radioelectric signal received by the mobile terminal, the local mean of the point strength of the radioelectric signal, and the median value of the local means of the point strength of the radioelectric signal.

The point strength is the value of the modulus (or envelope) of the radioelectric signal in a given point of the region, the dimensions of point being substantially equal to those of the physical element which is used to measure the point strength of the radioelectric signal: in this case, the mobile terminal antenna of few centimeters.

The local mean is the mean value of the point strength of the radioelectric signal within some tens of wavelengths long, which, having regard to the frequencies involved in mobile radiocommunications, results in considering paths 5 to 10 meters long or areas some tens of square meters wide.

The median value of the local means of the point strength of the radioelectric signal is a resumptive statistical value which, to guarantee a satisfying reliability (confidence) thereof, is to be computed by taking account of a congruous number of local means (10 to 20), which results in considering paths 50 to 100 meters long or areas few thousands of square meters wide.

Measuring the point strength of the radioelectric signal is not presently one of the key points in the development of radiocommunications network planning tools because of the extreme spatial variability of the radioelectric signal strength due to the "fine" structure (order of magnitude of the centimeter) of the surrounding environment.

Computing the local mean of the point strength of the radioelectric signal is, nowadays, still marginal in mobile radiocommunications network planning due to the modellization and computation complexity and to the huge amount of environmental data (cartographic database) to be processed. This quantity is generally taken into account only during coverage computation for micro cells (cells with radio base stations arranged at few meters from the ground), which are characterized by narrow territorial extents (diameter of some hundreds of meters) and which are the minority (about 10%) of the cells forming a typical mobile radiocommunications network.

Computation of this quantity is indeed hard to carry out for traditional cells, i.e. cells having a coverage area with a diameter of several kilometers, such as large cells (cells with radio base stations arranged on isolated masts) or small cells (cells with radio base stations arranged on building roofs), due to the high computation time and, above all, to the low reliability of the results at these distances.

On the contrary, computing the median value of the local means of the point strength of the radioelectric signal plays a paramount role in the development of radiocommunications network planning tools because in most cases this quantity represents the physical parameter associated with the concept of cell coverage. Therefore, nowadays the design of a mobile radiocommunications network is substantially based on a electromagnetic coverage prediction based on the median values of the local means.

A traditional cell coverage computation, sometimes also referred to as cell coverage prediction, is carried out by using a low environment resolution, i.e., by taking account of data describing the features of the environment within elementary areas, generally known as pixels, having a side of 50 or 100 meters.

The median values of the local means of the point strength of the radioelectric signal along the scanning lines are computed by taking account of the power radiating out from the radio base station, a open environment propagation curve, a morphological factor, a urbanization factor and an orographical factor (diffraction on natural obstacles).

In particular, the open environment propagation curve is indicative of the radioelectric signal strength attenuation, also known as propagation loss, in a open area, i.e., an area empty of trees, buildings or architectural structures made by human beings, and is generally expressed as a semi-empiric relation as a function of the power radiating from the radio base station antenna, antenna radiation pattern, distance from the radio base station and the mobile terminal, antenna tilt, radiation frequency, and effective antenna height with respect to the ground.

The orographical factor, urbanization factor and the morphological factor are correction factors for the open environment propagation curve and describe, respectively, the altitude features of the geographical area, the building features within areas having selectable sizes (e.g. 50 by 50 meters), and the geographical area in terms of morphological classes (forested, lakeside, etc.), which, as is known, influence radioelectric signal propagation.

In some cases, only morphological and urbanization features within the pixel for which computation of the local means of the radioelectric signal strength are taken into account, whereas in other cases, characterized by a more refined approach, these features all along the scanning lines are taken into account.

Lastly, computing diffraction on natural obstacles is the aspect that requires a more complex processing of the cartographic data. Starting from the orography, an altimetric profile is determined all along each scanning line, and the interaction effects (signal attenuation) with the possible natural obstacles arranged along the scanning lines are computed by resorting to the classic Huyghens-Fresnel theory, according to which such interaction effects may be assessed with adequate reliability by replacing each natural obstacle with an equivalent virtual obstacle (screen) having a knife edge shape, a height equal to the natural obstacle, an infinitesimal thick, endlessly extending perpendicularly to the propagation direction, and perfectly absorbing the incident electromagnetic signal.

Other more advanced approaches are provided, instead, for computing diffraction on natural obstacles by resorting, instead to an infinitesimal thick screen, to a finite thick screen having a rounded edge However, the approaches based on an infinitesimal thick screen are the most frequently used because they are simple and are adapted to this specific problem on the basis of some known algorithms which have been derived from the literature and appropriately modified and optimized to take into account the effects due to multiple obstacles. Examples of such known algorithms are the Epstein-Peterson method, the Deygout method and the stretched string method, the latter being recommended by ITU-R 526 and being the best trade-off between result reliability and algorithm computational speed and thus the most frequently used.

For a more detailed discussion of the low environment resolution cell coverage computation, the reader is referred to the following publications, which are incorporated herein by reference, in their entirety:

1) M. Hata, "*Empirical formula for propagation loss in land mobile services*", IEEE Trans. On Vehicular Technology, Vol. 29, 1980;

2) E. Damosso, L. Stola, "*Radiopropagazione*", Scuola Superiore Guglielmo Reiss Romoli, L'Aquila, 1992;

3) ITU-Reccommendations Rec. P. 526-3 "*Propagation by diffraction*";

4) G. Bussolino, R. Lanzo, M. Perucca, "*Rasputin: a field strength prediction model for large and small cell mobile system using territorial data base*", 7$^{th}$ International Network Planning Symposium, Sidney 1996;

5) COST 235 "*Radiowave propagation effects on next generation fixed service terrestrial telecommunication systems*", Chap. 4, Final Report EUR 16992 EN, 1996.

The need for a growing number of radio base stations, together with the need for more complete services, in particular services having features more and more detailed on a territorial level, has forced second and third generation mobile radiocommunications network providers to resort to a high environment resolution network design which enables definition of specific design parameters for very narrow territory elements. For example, along a road or in a square given services may be provided rather than others and, in any case, services with a level appropriate to the specific territorial, social and town reality.

The low environment resolution, which is typical of traditional mobile radiocommunications network design and planning, is evidently inadequate to cope with the above-mentioned needs, which may instead be partially satisfied by using a high environment resolution, i.e., by taking account of data describing the features of the environment within pixels having a side of 5 or 10 meters, which high environment resolution is more consistent with the dimensions of the town elements and, at the same time, allows computing the local means of the point strength of the radioelectric signal.

A number of different methodologies for computing high resolution environment cell coverage on the basis of the local means of the point strength of the radioelectric signal have been proposed.

For a detailed discussion of these methodologies, the reader is referred to the following publications, which are incorporated herein by reference, in their entirety:

1) EP-A-1 292. 163, "Method for determining the values of the electromagnetic field generated by a radio base station in an urban environment";

2) M. Perucca, M. Signetti "*Small cells planning analysis of electromagnetic models from measurements at 1800 MHz*", ICAP 1997;

3) COST Action 231 "*Digital mobile radio towards future generation systems*", Chap 4, Final Report EUR 18957, 1999, 4) ITU—R Rec. 1411 "*Propagation data and prediction methods for the planning of short range outdoor radio communication systems and radio local area networks in a frequency range 300 MHz to 100 GHz*";

5) US-A-2001/0041565 "Method and apparatus for network planning".

All of these methodologies, however, have been designed and developed for short distances from the radio base station, in particular distances shorter than 1 or 2 Kilometers, and consequently they involve a territorial analysis which is entirely carried out using a high environment resolution, i.e., considering pixels having a side of 5 or 10 meters.

Therefore, a paramount problem generally experienced in extending these approaches to large distances (10-20 km) is represented by the computation time and, above all, by the result reliability. In particular, once the refinement level of the computation model has been fixed, the result reliability depends mainly on the number of interactions with the surrounding environment along the scanning line which occur during computation of the local mean of the point strength of the radioelectric signal for the pixel considered. Inevitably, each interaction with the surrounding environment involves a given computation approximation and consequently a computation error which accrues during the computation.

Another difficulty generally encountered in extending these approaches to large distances is obtaining a high resolution digital cartography, which, due to cost and memory occupation, is generally available only for major urban areas. Therefore, it frequently happens that high environment resolution data are not available for part of the area for which high environment resolution coverage computation is needed.

OBJECT AND SUMMARY OF THE INVENTION

The aim of the present invention is to provide a method, a system and a computer program module for planning a radiocommunications network which provide a high efficiency computation within those areas for which high environment resolution data are available and an objective adaptive operativeness within the areas of transition from high to low environment resolution.

This aim is achieved by the present invention in that it relates to a method, a system and a computer program module for planning a radiocommunications network for mobile terminals.

In particular, radiocommunications network planning according to the present invention envisages dividing the region around the radio base station into a number of large environment pixels, dividing the large environment pixels into a number of small environment pixels, and then computing, for each target small environment pixel for which high environment resolution coverage computation is needed, a quantity indicative of the coverage within the target small environment pixel, such a quantity being computed for a given target small environment pixel as a function of data describing the environment within small environment pixels close to the target small environment pixel (where the mobile terminal is supposed to be located) and the radio base station along the propagation path of a radioelectric signal radiating out from the radio base station and passing through the target small environment pixel, and as a function of data describing the environment within large environment pixels in the remaining stretch of the radioelectric signal propagation path.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Figure 1:
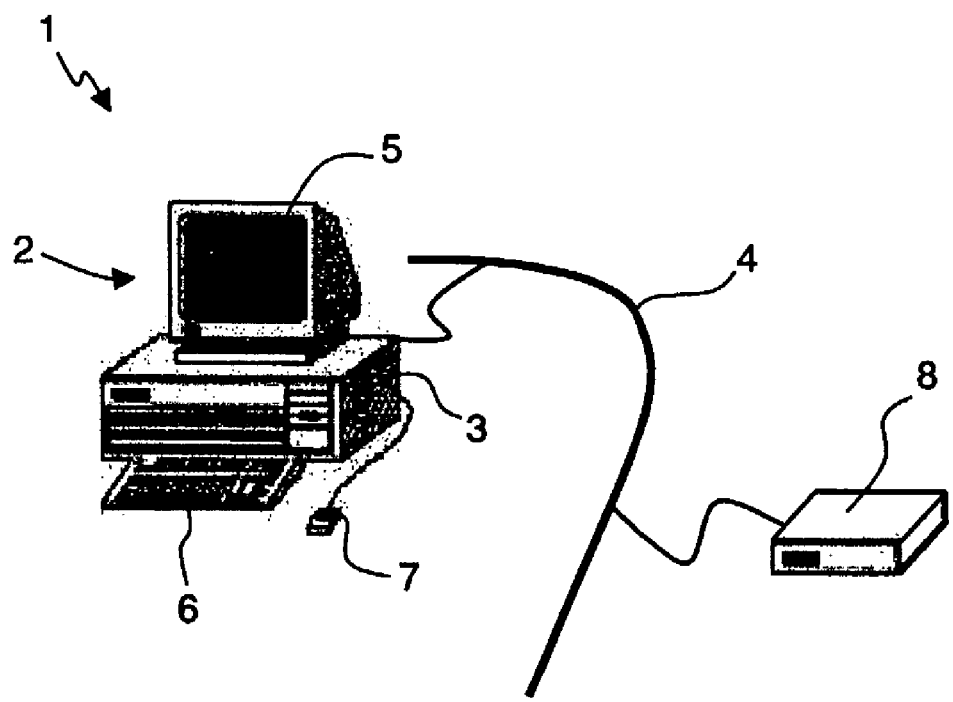
FIG. 1 shows a work station programmed to allow radio-communications network planning according to the present invention.

FIG. 1 shows a processing system for planning a radiocommunications network for mobile terminals. The processing system, designated as a whole by 1, essentially comprises a work station 2, for example a Hewlett Packard J5000 with a 450 MHz CPU, 1 Gbyte RAM, 18 Gbyte hard disk and UNIX operating system, having a central processing unit 3 connected to a local area network 4, an internal hard disk (not shown) storing reference databases, a display 5, a keyboard 6 and a mouse 7. Should the databases exceed the hard disk storage capacity, the work station 2 may also be provided with an external hard disk 8 connected to central processing unit 3 directly or through the local area network 4.

The work station 2 is configured to allow radiocommunications network planning on the basis of computer program modules which run on the central processing unit 3 and implementing the planning method in accordance with the present invention, with the aid of the reference databases stored in the internal hard disk or in the external hard disk 8.

The present invention originates from the following considerations related to the propagation phenomenology in mobile channels.

The first consideration is that the median value of the point strength of a radioelectric signal within an area of a given size is approximately amenable to the environment features averaged within such an area, i.e., there is a correlation between cartographic resolution and size of the areas within which coverage is to be computed. In other words, this means that to compute the local mean of the point strength of a radioelectric signal within areas having a side of some tens of wave length, it is strictly necessary to have a cartographic resolution which allows description of the environment within areas of the same size, i.e., in view of the frequency band involved in mobile communications (900-2200 MHz), within environment pixels having a side of 5-10 meters.

The second consideration is that, regardless of the cartographic resolution, coverage computation is mainly influenced by the environment close to the mobile terminal and the radio base station. Having regard to the average position of the fixed terminal, i.e., the radio base station (at least at building roof level) and of the mobile terminal (any position), it is clear that the environment close to the mobile terminal interacts even more intensely with the latter and is therefore the one on which attention must be focused. However, the environment close to the fixed terminal, in particular within urban areas with a high building concentration, plays an important role because it is operatively impossible to guarantee absence of close obstacles (mainly buildings) and therefore it is appropriate to treat the environment close to the fixed terminal in the same way as the environment close to the mobile terminal.

Figure 2:
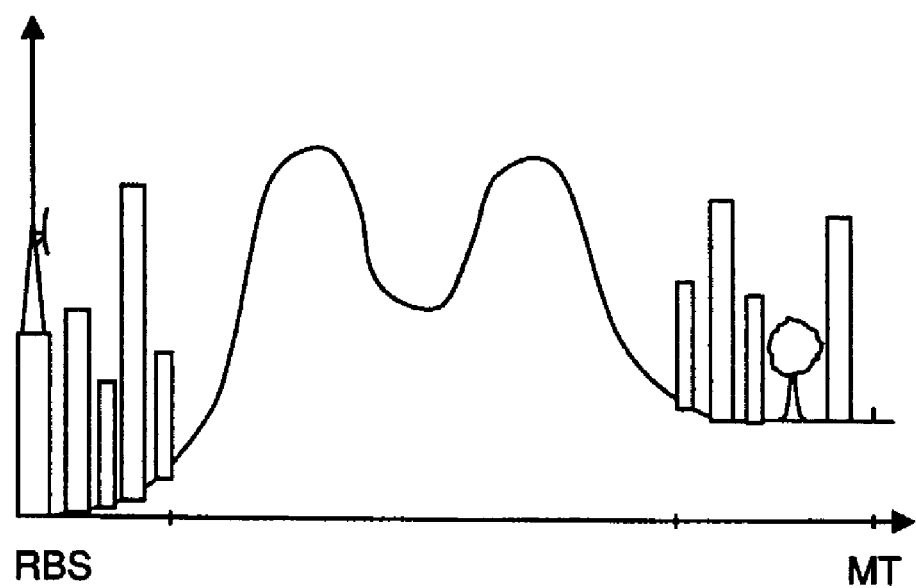
FIG. 2 shows schematically an example of environment between the radio base station and the mobile terminal.

FIG. 2 shows schematically an example of environment between the radio base station RBS and a mobile terminal MT: it is evident how buildings and vegetation close to the radio base station RBS and the mobile terminal MT highly influence radioelectric signal propagation, and how diffraction on the ground is the predominant effect in the intermediate stretch of the radioelectric signal propagation path.

In view of the foregoing, broadly speaking the brainwave at the basis of the present invention is to compute cell coverage by using a double environment resolution, i.e., by using a high environment resolution (small environment pixels, for example of 10 by 10 meters) close to the mobile terminal and the radio base station, so as to take account of the higher influence on the coverage computation of the environment close to the fixed and mobile terminals, and a low environment resolution (large environment pixels, for example of 50 by 50 meters) in the remaining intermediate stretch of the radioelectric signal propagation path, wherein "close" means a stretch of the radioelectric signal propagation path in the order of some hundreds of meters.

Therefore, according to the present invention high environment resolution cell coverage computation envisages dividing the region around the radio base station into a number of large environment pixels (for example of 50 by 50 meters), dividing the large environment pixels into a number of small environment pixels (for example of 10 by 10 meters), and then computing, for each small environment pixel for which high environment resolution coverage computation is needed, a quantity indicative of the coverage within the small environment pixel. In particular, for a given target small environment pixel such a quantity is computed as a function of data describing the environment between the radio base station and the target small environment pixel along the propagation path of a radioelectric signal radiating out from the radio base station and passing through the target small environment pixel, and in particular as a function of data describing the environment within small environment pixels close to the target small environment pixel (i.e., the mobile terminal) and/or the radio base station along the radioelectric signal propagation path, and as a function of data describing the environment within large environment pixels in the remaining stretch of the radioelectric signal propagation path.

In particular, first of all availability of data describing the environment within small environment pixels close to the radio base station and the target small environment pixel along the radioelectric signal propagation path is checked, and then a mixed resolution environment profile is formed which describes the environment within small environment pixels close to the radio base station and/or the target small environment pixel depending on environment descriptive data availability, and within large environment pixels along the remaining stretch of the radioelectric signal propagation path. In other words, in high environment resolution coverage computation for a given target small environment pixel the environment between the radio base station and the target small environment pixel along the radioelectric signal propagation path is described by using a high resolution close to the radio base station and the mobile terminal and a low resolution in the remaining stretch of the radioelectric signal propagation path.

In this way, a multiple resolution coverage map is provided which contains high environment resolution coverage data (local means) for those areas for which high resolution environment data are available and low resolution coverage data (median values) for those areas for which only low resolution environment data are available.

High environment resolution coverage computation according to the present invention will now be described with reference to FIGS. 3-9 and to a non-limiting preferred embodiment wherein the large environment pixels have a size of 50 by 50 meters, the small environment pixels have a size of 10 by 10 meters. Along the radioelectric signal propagation path high resolution environment description will be used within a stretch of 500 meters from the mobile terminal and within a stretch of 1 km from the radio base station, whereas low resolution environment description will be used in the remaining stretch of the radioelectric signal propagation path.

Figure 3:
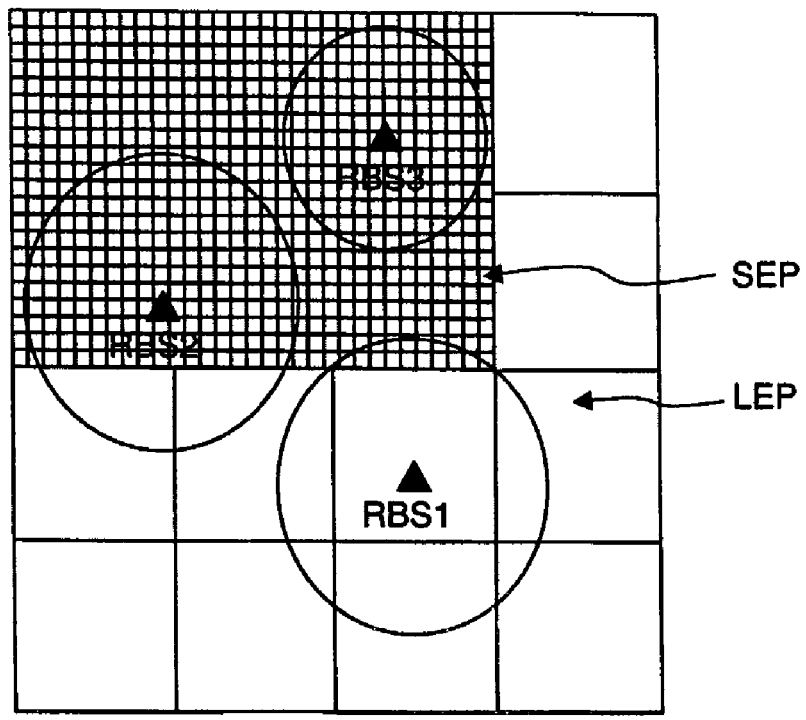
FIG. 3 shows three possible scenarios which may be encountered during high environment resolution coverage computation according to the present invention.

FIG. 3 shows three possible scenarios which may be encountered during high environment resolution coverage computation, wherein large and small environment pixels are denoted by LEP and SEP, respectively.

Taking into account the calculation distances, which can be different for each cell and which are shown as circles in FIG. 3, in the first scenario, the radio base station (RBS1) is located outside the area for which high environment resolution coverage computation is needed and for part of this area high resolution environment data are available, in the second scenario the radio base station (RBS2) is located inside the area for which high environment resolution coverage computation is needed, but for part of this area only low resolution environment data are available, and in the third scenario the radio base station (RBS3) is located inside the area for which high environment resolution coverage computation is needed, and for the entire area high resolution environment data are available.

Figure 4:
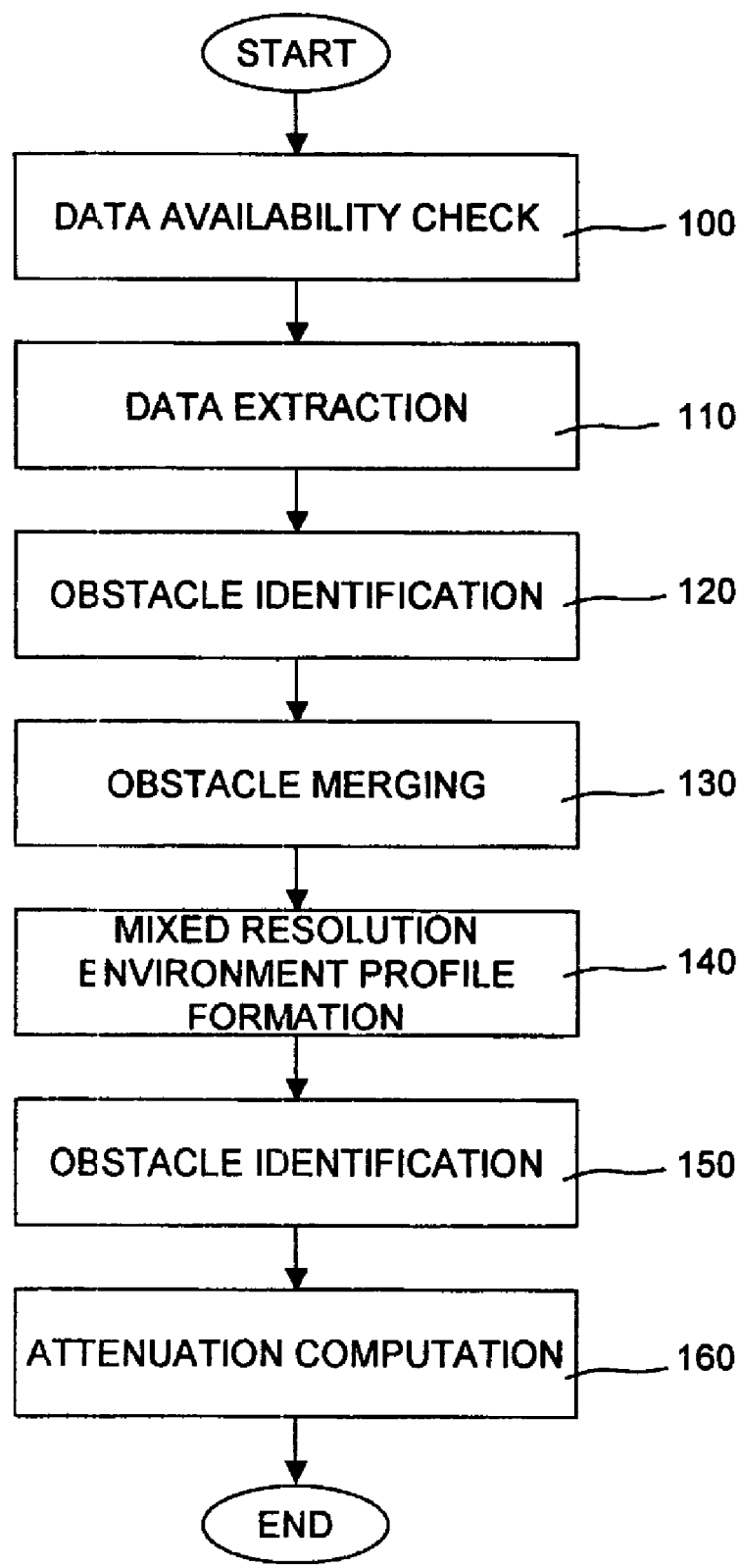
FIG. 4 shows a flow chart of the radiocommunications network planning method of the present invention.
Figure 5:
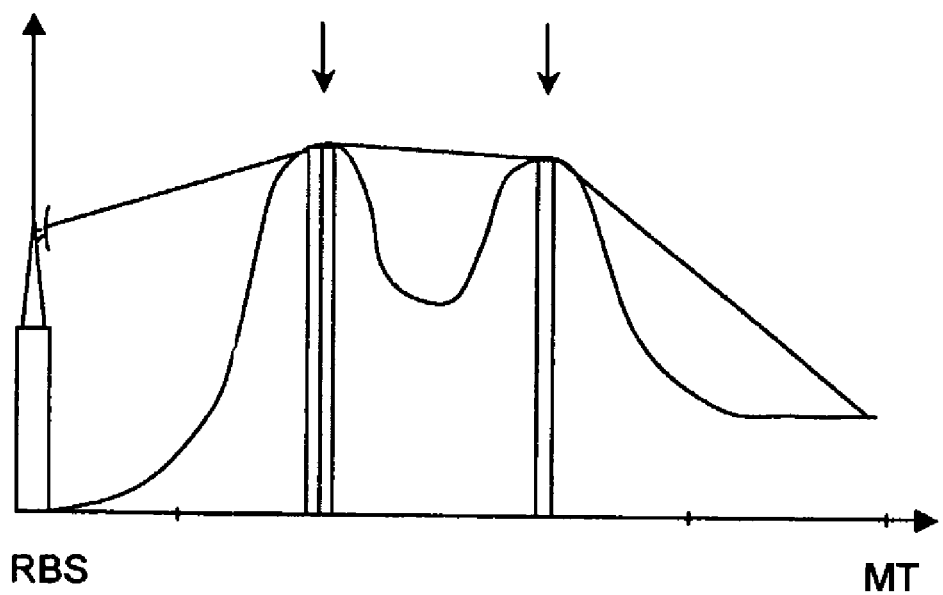
FIG. 5-8 show different intermediate environment profiles computed during high environment resolution coverage computation according to the present invention.
Figure 6:
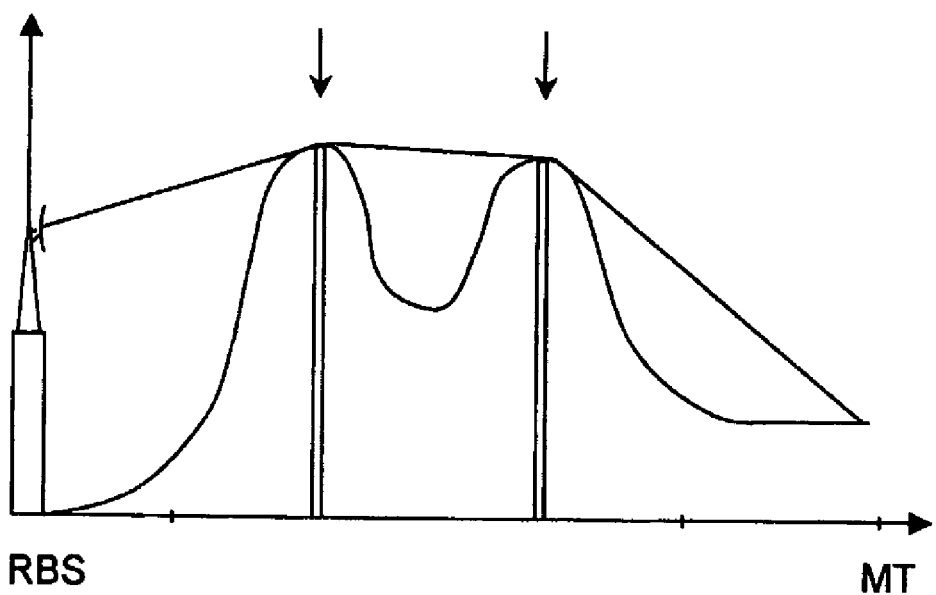

FIG. 4 shows a flow-chart of the high environment resolution coverage computation of the present invention, which computation involves executing the following steps which have to be repeated for each small environment pixel for which high environment resolution coverage computation is desired, (target small environment pixel).

The first step is checking availability of data describing the environment within small environment pixels close to the radio base station (1 km) and the target small environment pixel (500 meters) along the radioelectric signal propagation path (block 100). In particular, the following high resolution environment data close to the radio base station and to the target small environment pixel are to be available: average ground altimetry (ground altitude with respect to the sea level) within the small environment pixel, information as to the presence of a building, vegetation or nothing within the small environment pixel, and height of the building or vegetation within the small environment pixel.

The second step is extracting data from a digital cartographic database, wherein data are extracted which describe the environment within large environment pixels along the entire radioelectric signal propagation path from the radio base station to the target small environment pixel, and, depending on environment descriptive data availability, which describe the environment within small environment pixels close to the radio base station and/or the target small environment pixel (block 110). In particular, for all large environment pixels between the radio base station and the target small environment pixel, the following low resolution environment data is extracted: ground altimetry (ground altitude with respect to the sea level) within each large environment pixel, whereas for all small environment pixels close to the radio base station and the target small environment pixel, the following high resolution environment data are extracted: ground altimetry (ground altitude with respect to the sea level) within each small environment pixel, information as to the presence of a building, vegetation or nothing within each small environment pixel, and height of the building or vegetation within each small environment pixel.

The third step is identifying obstacles between the radio base station and the target small environment pixel for which coverage computation is being carried out, wherein obstacles encountered within large environment pixels by a radioelectric signal along its propagation path from the radio base station to the target small environment pixel are identified by considering only low resolution environment data along the entire propagation path and by using the so-called stretched string technique, which is defined in the aforementioned ITU-Recommendations and according to which only those obstacles which are "touched" by an ideal stretched string extending between the radio base station and the small environment pixel for which computation is being carried out are identified (block 120). Since low resolution environment data define only the ground altimetry along the entire propagation path between the radio base station and the target small environment pixel, the outcome of this step is an intermediate environment profile shown in FIG. 5 formed by a number of groups of obstacles, denoted by rows in FIG. 5, whose locations correspond to the points where the stretched string extending between the radio base station RBS and a hypothetical mobile terminal MT within the target small environment pixel touches the ground altimetric profile, and whose height is equal to the ground height in these points.

The fourth step is consolidating or merging the identified obstacles, during which those identified obstacles which are spaced one from another of a distance lower than a given distance, for example 500 meters, are consolidated into a single obstacle, thus reducing the overall number of obstacles and forming a small group of equivalent obstacles (block 130). The outcome of this step is an intermediate environment profile shown in FIG. 6 formed by a number of equivalents obstacles, denoted by rows in FIG. 6, each having the shape of a knife blade.

Figure 7:
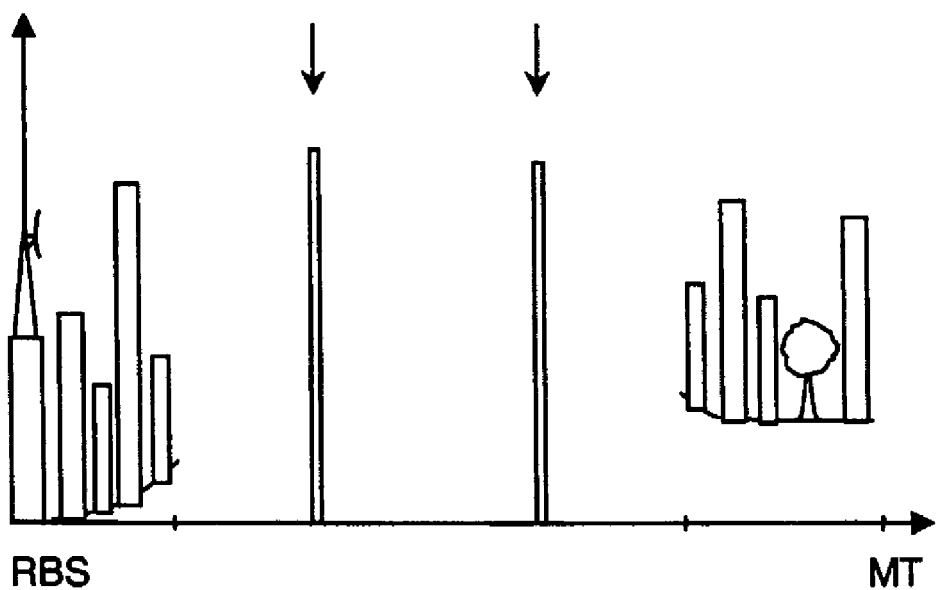
Figure 8:
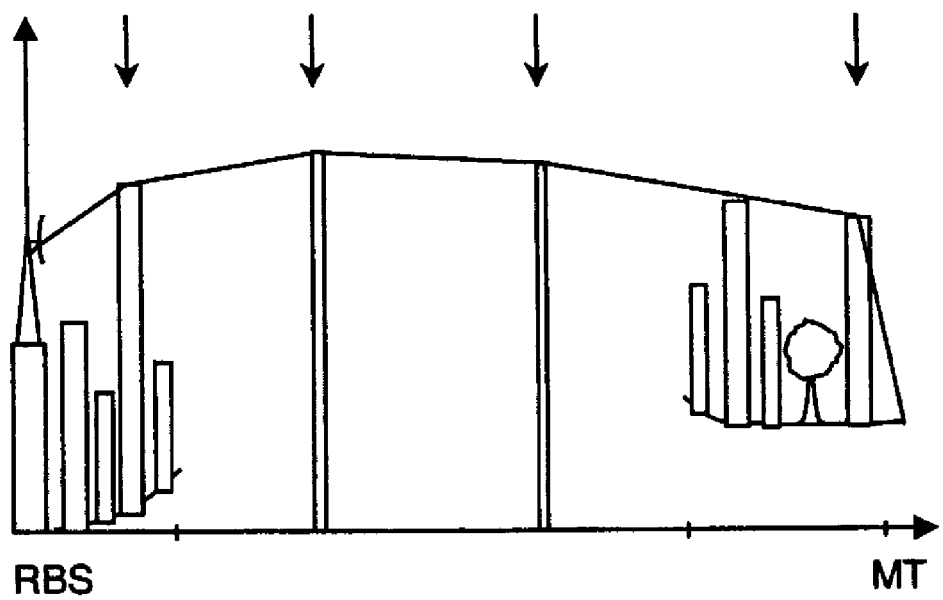

The fifth step is forming a mixed resolution environment profile describing the environment between the radio base station and the target small environment pixel along the radioelectric signal propagation path by combining high and low resolution environment data. (block 140). In particular, as shown in FIG. 7, the mixed resolution environment profile has one or both ends describing the environment within small environment pixels close to the radio base station RBS and the target small environment pixel within which the hypothetical mobile terminal MT is located, depending on high resolution environment descriptive data availability, and an intermediate part describing the consolidated identified obstacles.

The sixth step is identifying obstacles between the radio base station and the small environment pixel for which coverage computation is being carried out, during which obstacles encountered by a radioelectric signal along its propagation path from the radio base station to the small environment pixel are identified within the mixed resolution environment profile by using the aforementioned stretched string technique and without grouping or compacting any obstacles of a size larger than a given resolution (block 150). The outcome of this step is a number of obstacles, denoted by rows in FIG. 8, whose locations correspond to the points where the stretched string extending from the radio base station RBS and the hypothetical mobile terminal MT touches the mixed resolution environment profile, and whose height is equal to the height of these obstacles.

The seventh step is computing attenuation by diffraction on the obstacles identified within mixed resolution environment profile, without grouping or compacting any obstacles, of a radioelectric signal radiating out from the radio base station along the propagation path to the small environment pixel (block 160). In particular, computing attenuation by diffraction includes computing a first contribution due to orographic obstacles, computing a second contribution due to buildings, computing a third contribution due to vegetation, and then the whole attenuation by diffraction as a weighted sum of the first, second and third contributions. In particular, each contribution is weighted by using a respective weight which is indicative of the nature of the respective obstacle (orographic obstacles, buildings and vegetation).

For example, attenuation by diffraction may be computed by using the following formula:

$$A_{diff} = p_o \cdot A_o + p_B \cdot A_B + p_G \cdot A_G = p_o \cdot \sum_{i=1}^{s} a_o(i) + p_B \cdot \sum_{i=1}^{q} a_b(i) + p_G \cdot \sum_{i=1}^{r} a_g(i)$$

wherein:
- $A_O$, $A_B$, $A_G$ are attenuations by diffraction due to orographic obstacles, building obstacles and vegetation obstacles, respectively;
- s is the overall number of orographic obstacles;
- q is the overall number of building obstacles;
- r is the overall number of vegetation obstacles;
- $p_O$, $p_B$, $p_G$ are the weights for the three contributions, which may be for example equal to 0.75, 0.5 and 0.25, respectively.

Another aspect of the present invention is the way of computing coverage within a building which occupies some small environment pixels. In view of the complexity of the propagation phenomena induced by this particular physical conditions, this specific topic is commonly addressed in the prior art by hypothesizing, on a statistical basis, a single additional penetration margin for the entire building, if necessary appropriately differentiated by environment typology and/or building typology, which is added to the coverage (median value of the local means of the point strength of the radioelectric signal) computed for the small environment pixels but considering the environment open, i.e., empty of buildings.

From an experimental point of view, this common approach envisages measuring the average point strength of radioelectric signals outside the building (for example along the perimeter of the building, at ground level) and then adding the hypothesized penetration margin. From a modellistic point of view, instead, this approach implicitly involves a low resolution coverage computation for the large environment pixels occupied by the building, i.e., involves computing the median values of the local means of the point strength of a radioelectric signal within the large environment pixels occupied by the building by using low resolution environment data (percentage of each large environment pixel occupied by the building).

This approach is not compatible with a high environment resolution coverage computation because, in view of the size of the small environment pixels, the percentage of each small environment pixel which is occupied by a building would be 0 or 100% (absence or presence of a building).

Figure 9:
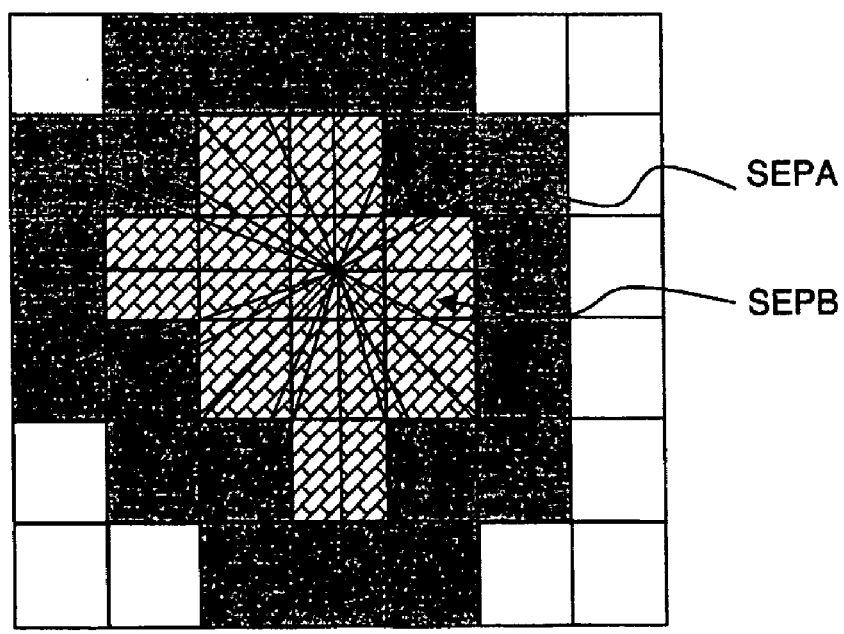
FIG. 9 shows small environment pixels occupied by a building and for which high environment resolution coverage is computed.

Therefore, instead of hypothesizing a single additional penetration margin to be added to the coverage computed for the large environment pixels occupied by the building, as shown in FIG. 9 the coverage (local mean of the point strength of a radioelectric signal) for each small environment pixel SEPB occupied by the building, depicted with a geometrical pattern, is computed as a function of the coverages computed for the small environment pixels SEPAS, depicted in grey, surrounding the small environment pixels SEPB. In particular, as shown in FIG. 9, coverage for a small environment pixel SEPB occupied by a building is computed as a weighted average of the coverages computed for the small environment pixels SEPA surrounding the small environment pixel SEPB, and such coverages are weighted by using respective weights which may for example be inversely proportional to the squared distances ($1/r^2$) between the centers of the small environment pixel SEPB and the small environment pixels SEPA surrounding the small environment pixel SEPB. Obviously, other weights may be used, all however having values which reduce as the distance increases.

Finally, it is clear that numerous modifications and variants can be made to the present invention, all falling within the scope of the invention, as defined in the appended claims.

For example, high environment resolution coverage computation may be carried out for all or only some small environment pixels, depending on the needs of the mobile radiocommunications network provider.

Furthermore, high environment resolution coverage computation for a target small environment pixel may be carried out as a function of data describing the environment within all or only some small environment pixels close to the radio base station and the target small environment pixel along the radioelectric signal propagation path, as well as of data describing the environment within all or only some large environment pixels along the remaining stretch of the radioelectric signal propagation path, depending on the reliability which is needed for the high environment resolution coverage computation.

Lastly, data describing the environment within large and small environment pixels may be different than the ones described above. For example, low resolution environment data describing the environment within large environment pixels may include, in addition to ground altimetry, also average building height and morphology.

The invention claimed is:

1. A method for planning a radiocommunications network, comprising:
computing cell coverage, using a computer, to indicate a region around a radio base station where a radioelectric signal radiating out from the radio base station copes with given requirements;
wherein computing the cell coverage comprises:
dividing the region around said radio base station into a number of first areas; dividing at least some of said first areas into a number of second areas; and for at least some target second areas of said second areas, computing respective quantifies indicative of the cell coverage within said target second areas, each quantity being computed for a respective target second area as a function of data describing an environment between said radio base station and said target second area along a propagation path of a radioelectric signal radiating out from said radio base station and passing through said target second area;
each quantity being computed for the respective target second area as a function of data describing the environment within at least some said second areas close to at least one of said radio base station and said target second area along the radioelectric signal propagation path, and as a function of data describing the environment within at least some said first areas along the remaining stretch of the radioelectric signal propagation path, wherein computing each quantity for the respective target second area comprises:
forming a mixed resolution environment profile describing the environment between said radio base station and said target second area along said radioelectric signal propagation path,
wherein forming the mixed resolution environment profile comprises:
identifying obstacles encountered by said radioelectric signal within at least some said first areas along the propagation path from said radio base station to said target second area; and
consolidating identified obstacles which are spaced apart one from another at a distance lower than a given distance.

2. The method as claimed in claim 1, wherein computing each quantity for the respective target second area comprises:
checking availability of data describing the environment within at least some second areas close to said radio base station and said target second area; and
computing said quantity on the basis of said mixed resolution environment profile,
wherein said mixed resolution environment profile describes the environment within at least some second areas close to at least one of said radio base station and said target second area depending on environment descriptive data availability, and within at least some first areas along the remaining stretch of the radioelectric signal propagation path.

3. The method as claimed in claim 2, wherein forming the mixed resolution environment profile comprises:
forming the part of the mixed resolution environment profile describing the environment within at least some first areas along the remaining stretch of the radioelectric signal propagation path so that said part describes the obstacles identified within said first areas.

4. The method as claimed in claim 3, wherein forming the part of the mixed resolution environment profile describing the environment within at least some first areas along the remaining stretch of the radioelectric signal propagation path so that said part describes the obstacles identified within said first areas comprises:
forming the part of the mixed resolution environment profile describing the environment within at least some first areas along the remaining stretch of the radioelectric signal propagation path so that said part describes said consolidated obstacles.

5. The method as claimed in claim 3, wherein obstacles encountered by said radioelectric signal within at least some first areas along the propagation path from said radio base station to said second area are identified according to a stretched string technique.

6. The method as claimed in claim 2, wherein forming the mixed environment profile comprises:
forming a first end and a second end of said mixed resolution environment profile describing the environment within at least some second areas close to said radio base station and said target second area depending on environment descriptive data availability.

7. The method as claimed in claim 2, wherein computing said quantity on the basis of said mixed environment profile comprises:
identifying obstacles encountered by said radioelectric signal along the propagation path from said radio base station to said target second area on the basis of said mixed resolution environment profile; and
computing said quantity on the basis of said identified obstacles.

8. The method as claimed in claim 7, wherein said obstacles are identified according to a stretched string technique.

9. The method as claimed in claim 7, wherein computing said quantity on the basis of said identified obstacles comprises:
computing attenuation by diffraction on said identified obstacles of a radioelectric signal radiating out from said radio base station along the propagation path to said second area,
wherein computing attenuation by diffraction comprises:
computing a first contribution due to orographic obstacles;
computing a second contribution due to buildings;
computing a third contribution due to vegetation; and
computing said attenuation by diffraction as a weighted sum of said first, second and third contributions.

10. The method as claimed in claim 1, wherein the environment within second areas close to said radio base station and said target second area along the radioelectric signal propagation path is described by using a first resolution and the environment within first areas along the remaining stretch of the radioelectric signal propagation path is described by using a second resolution lower than said first resolution.

11. The method as claimed in claim 1, wherein said data describing the environment within said second areas close to said radio base station and said second area along the radioelectric signal propagation path include average ground altimetry, information as to the presence of a building, vegetation or nothing, and height of the building or vegetation.

12. The method as claimed in claim 1, wherein said data describing the environment within said first areas along said at least part of the remaining stretch of the radioelectric signal propagation comprises average ground altimetry.

13. The method as claimed in claim 12, wherein a quantity for a respective second area occupied by a building is computed as a function of quantities computed for second areas surrounding the second area occupied by the building.

14. The method as claimed in claim 13, wherein a quantity for a respective second area occupied by a building is computed as a weighted average of quantities computed for second areas surrounding the second area occupied by the building.

15. The method as claimed in claim 14, wherein said quantities computed for second areas surrounding the second area occupied by the building are weighted by using respective weights which are inversely proportional to the squared distance between the second area occupied by the building and the second areas surrounding the second area occupied by the building.

16. A processing system capable of being programmed to implement the method according to claim 1.

17. Computer program modules comprising computer program code means, said computer program modules being able, when loaded in a processing system, to implement the method according to claim 1.

* * * * *